United States Patent [19]

Piety, Jr. et al.

[11] Patent Number: 5,249,138
[45] Date of Patent: Sep. 28, 1993

[54] ANALOG SIGNAL PREPROCESSOR

[75] Inventors: Kenneth R. Piety, Jr.; Stewart V. Bowers, III; Timothy A. Craven, all of Knoxville, Tenn.

[73] Assignee: Computational Systems, Inc., Knoxville, Tenn.

[21] Appl. No.: 638,747

[22] Filed: Jan. 7, 1991

[51] Int. Cl.⁵ ............................................. G08C 19/00
[52] U.S. Cl. .................................. 364/508; 364/132; 364/572; 364/574; 340/679
[58] Field of Search ............... 364/508, 807, 160, 180, 364/132, 571.01, 497, 572, 574; 340/679, 682, 683; 324/77 B, 78 F

[56] References Cited

U.S. PATENT DOCUMENTS

| | | | |
|---|---|---|---|
| 4,602,326 | 7/1986 | Kraus | 364/160 |
| 4,644,284 | 2/1987 | Friedline et al. | |
| 4,757,463 | 7/1988 | Ballou et al. | |
| 4,821,167 | 4/1989 | Wiebe | |
| 4,831,560 | 5/1989 | Zaleski | |
| 4,924,418 | 5/1990 | Bachman et al. | |
| 4,931,949 | 6/1990 | Hernandez et al. | 364/497 |
| 4,937,758 | 6/1990 | Hayden et al. | 364/508 |
| 4,953,074 | 8/1990 | Kametani et al. | 364/132 |
| 5,060,890 | 10/1991 | Utterback et al. | 340/682 |
| 5,191,327 | 3/1993 | Talmadge et al. | 364/572 |

OTHER PUBLICATIONS

P. F. J. Burgess Antifriction Bearing Fault Detection Using Envelope Detection, presented at IPENZ Conference Auckland 1986.

Primary Examiner—Jerry Smith
Assistant Examiner—Steven R. Garland
Attorney, Agent, or Firm—Luedeka, Hodges, Neely & Graham

[57] ABSTRACT

The specification describes a system for analyzing and processing an input analog signal. This invention provides an analog signal preprocessor which is operated in conjunction with a main instrument for measuring any defects or wear of machinery parts. The analog signal preprocessor operates to preprocess an analog signal by filtering and amplifying a signal from the analog signal to allow a more accurate reading by the main instrument. The preprocessor will adjust itself for optimum operation and communicate the operation modes to the main instrument. Also, the preprocessor can be addressed by the main instrument to setup the operation of the preprocessor according to a program or input entered into the main instrument.

14 Claims, 4 Drawing Sheets

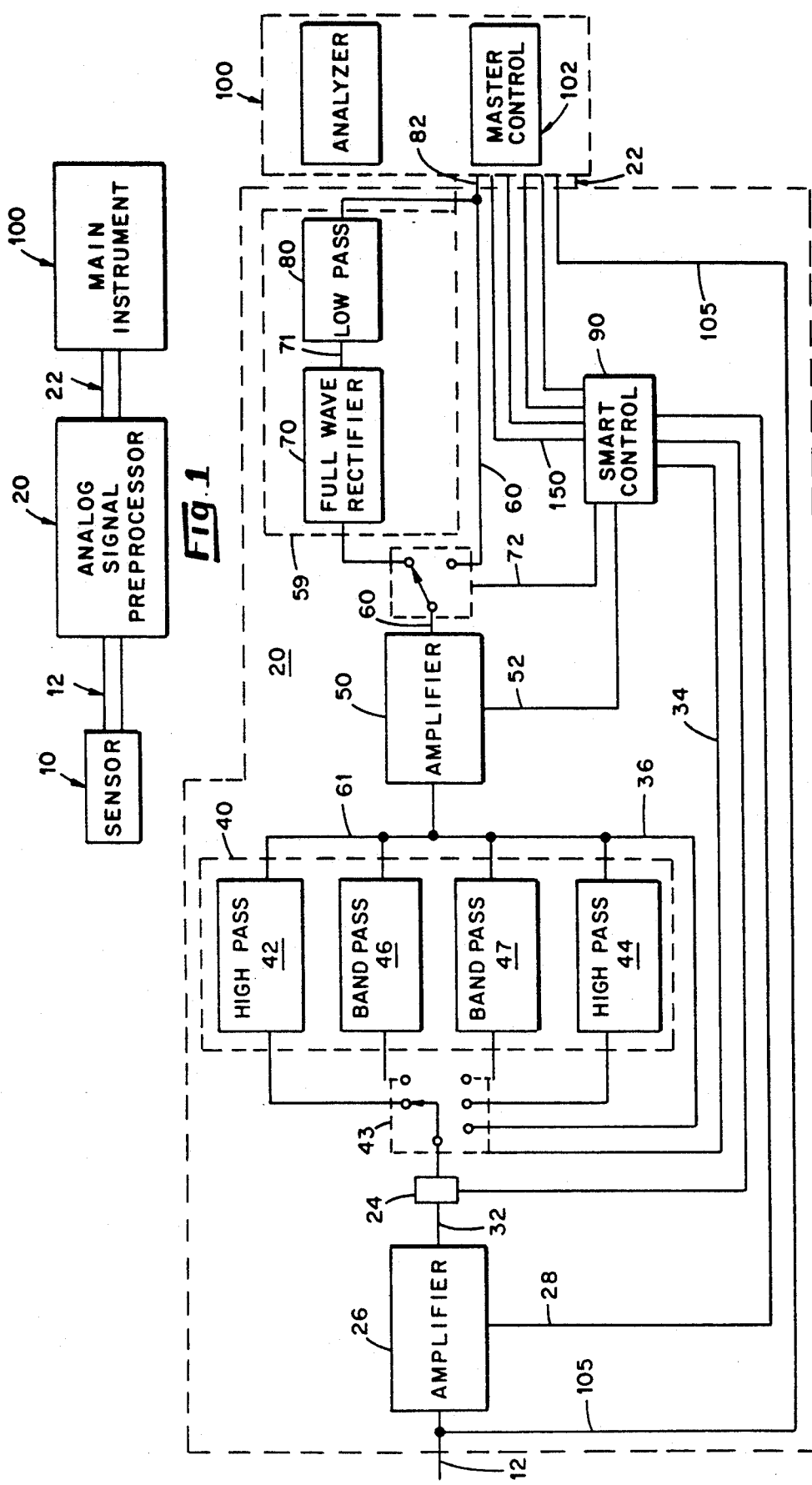

ANALOG SIGNAL PREPROCESSOR

BACKGROUND OF THE INVENTION

This invention relates to preprocessing and analyzing an analog signal such as a vibration signal and more specifically to a system having an analog signal preprocessor interfaced with a separate main instrument.

Sometimes the analog signal to be analyzed is a low amplitude signal which is often buried by larger amplitude signals in the noise of the analyzer or by the noise of the sensor obtaining the signal. It is difficult for an analyzer to perform an accurate analysis on the signal due to the analyzer's inability to filter out meter noise from the low amplitude signals. Thus the signal needs to be preprocessed in order to amplify or extract the signal desired so that the analyzer can perform an analysis on the signal. The function of preprocessing is to filter or amplify the input signal to allow the analyzer to optimize its performance. The preprocessor includes high pass filters, band pass filters, an envelope demodulator and amplifier circuits.

Signal processors and vibration analyzers are used for detecting defects and worn or broken parts in machinery. The analyzers are used to monitor the vibration signals from an accelerometer, electrical current signals from a current transformer or other sensor attached to a piece of machinery in order to detect these defects. These past uses functionally had the analyzer and envelope demodulator operate independently of each other. This independence proves to be a hindrance when an accurate reading is sought since each is operating according to it's predetermined manually adjusted setup.

Other problems of obtaining accurate readings include the envelope demodulator usually being comprised of only a bandpass filter and a rectifier. Typically the band pass filter is manually adjusted in order to extract the desired carrier signal to analyze. These manual adjustments are difficult to maintain due to the changing characteristics of the analog signal.

Often the analog signal's characteristics are such that only certain functions are needed to be performed on the signal to produce an optimum signal for the analyzer. This requires the ability to be flexible in the operation of the preprocessor such that only certain filtering and/or amplifying functions are to be performed.

The Hernedez U.S. Pat. No. 4,931,949 describes a method and apparatus for detecting gear defects. The apparatus includes an accelerometer which feeds a signal into an interface which then feeds a signal to an analog signal preprocessor. This analog signal preprocessor includes full wave rectifiers and low pass filters to extract an amplitude envelope. The full wave rectifiers and low pass filters are controlled by a data bus. The analog signal preprocessor amplifies the input signal and the input of the digital converter. The envelope is then converted into a digital signal to be processed by a computer. The Hernedez patent does not disclose a system which has the ability to communicate interactively between the analog signal preprocessor and the computer. Nor does the Hernedez system disclose an analog signal preprocessor which can self adjust to the input analog signal. Furthermore, the computer cannot analyze the signal without the analog signal preprocessor.

The present invention provides a system which analyzes an analog signal that utilizes an analyzer and an analog signal preprocessor. The analyzer interacts with the preprocessor to optimize the performance of the analyzer. The preprocessor has the ability to automatically adjust gain settings according to the input analog signal's characteristic. Also, the analyzer will operate without the analog signal preprocessor.

This invention overcomes the problem of inflexibility and difficulty in getting an accurate reading which will detect defects and wear. The present invention allows the analog signal preprocessor and the analyzer or computer to interact, thereby enabling the computer to setup the preprocessor according to a manual input or a predetermined program or have the preprocessor, which is smart, to autorange itself according to the input signal and relay its select range to the analyzer or computer. This allows either the operator to adjust the preprocessor or the preprocessor to adjust itself, thereby providing a more accurate and flexible means for detecting part wear and defects in machinery.

SUMMARY OF THE INVENTION

In general, the invention comprises a system for analyzing and processing an input signal. The system comprises an analog signal preprocessor and a main instrument. The analog signal preprocessor has at least one stage for receiving an input signal and processing the input signal. A stage is that part of an instrument which will perform or not perform a function. The stage has at least two operating modes. An operating mode is the performance or nonperformance of an operation by the stage. The first operating mode produces a first preprocessed signal and the second operating mode produces a second preprocessed signal. A smart controller is used to control the stage and select one of the operating modes.

The main instrument receives the preprocessed signal and analyzes the preprocessed signal. A master controller in the main instrument produces stage control signals to control the operation of the system. The smart controller of the preprocessor receives the stage control signals through a communication line and responds to the stage control signals by selecting the operating mode for the stage.

The analog signal preprocessor has the ability to adjust to the changing amplitude characteristics of the analog signal. The smart controller monitors the analog signal and adjusts the gain to optimize the performance of the various stages of the analog signal preprocessor. These gain adjustments are communicated to the main instrument's master controller. One purpose of the adjustments is to prevent the various stages from overloading and operating outside their limitations.

The analog signal preprocessor may also be manually set by the user. These manual settings are entered into the main instrument which then communicates the settings to the smart controller of the analog signal preprocessor. The smart controller then sets the stages to the manual settings entered. If an overload occurs in one of the stages, due to the manual settings, then the smart controller will transmit a signal back to the main instrument indicating an overload exists in the analog signal preprocessor. The overload is cured by manually changing the settings through the main instrument.

The input signal will have a direct current offset and the analog signal preprocessor will also supply a slight direct current offset to the signal. This becomes a problem when the modulated signal is small. To compensate for the direct current offset, the analog signal preprocessor has an important feature, an amplification stage after a filter stage and prior to an envelope demodulator stage. This is helpful when a modulated signal is smaller than the direct current offset. The amplifier stage magnifies small signals and helps prevent the direct current offset from affecting the performance of the envelope demodulator.

Other advantages of the invention will be apparent from the following description, the accompanying drawings and the appended claims.

BRIEF DESCRIPTION OF THE DRAWINGS

FIG. 1 is a functional block diagram of the system for analyzing an input signal.

FIG. 2 is a block diagram of the analog signal preprocessor and the main instrument.

DETAILED DESCRIPTION OF THE PREFERRED EMBODIMENT

Figure 3:
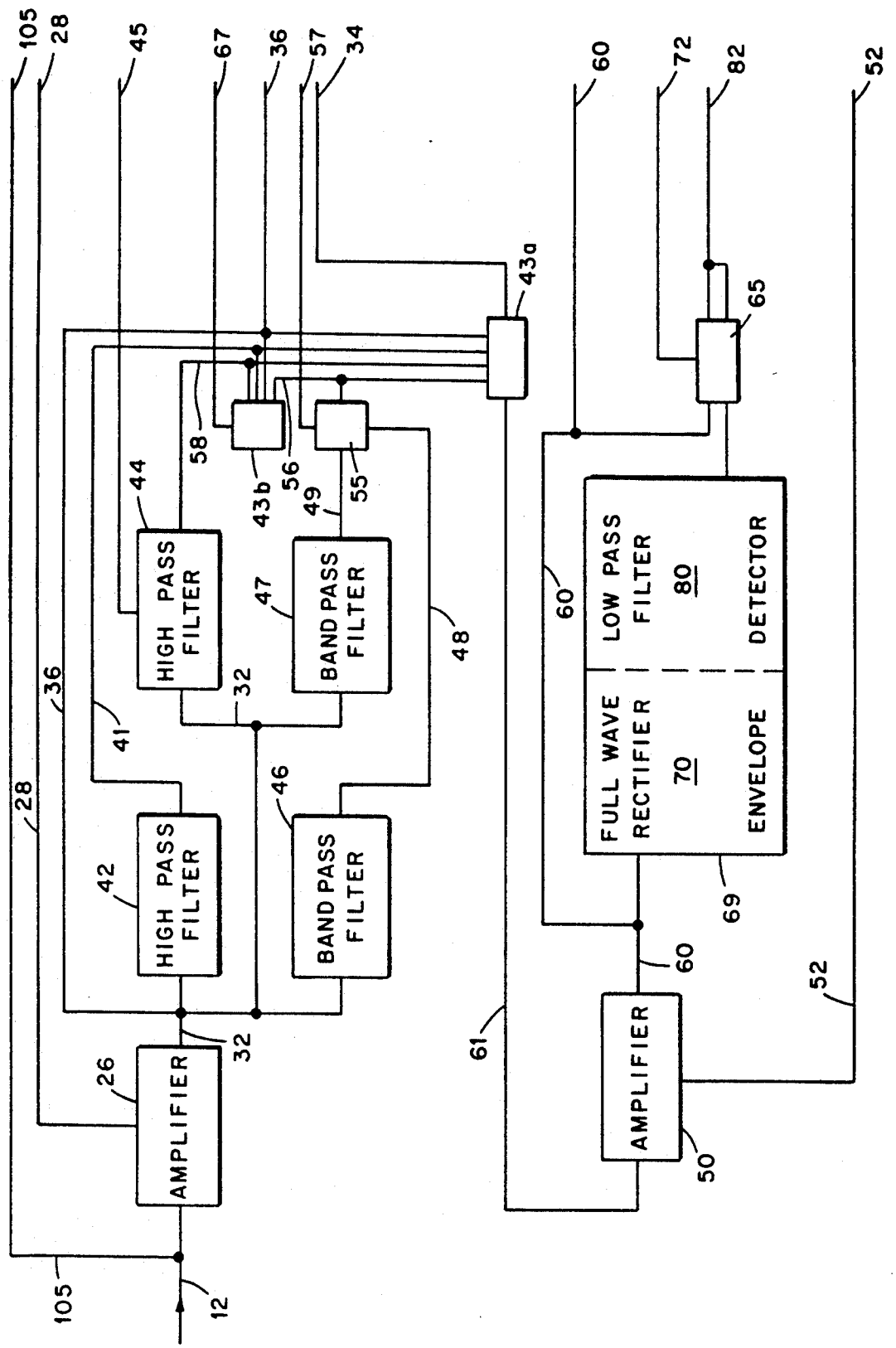
FIG. 3 is a detailed block diagram of the analog signal preprocessor processing circuitry.

With initial reference to FIG. 1 the system includes a sensor 10, an analog signal preprocessor 20 and a main instrument 100 such as a frequency analyzer manufactured by Computational Systems, Inc., model 2110. The sensor 10 is attached to the analog signal preprocessor 20 by communication means 12, preferably a cable of the sensor 10. The analog signal preprocessor 20 communicates with the main instrument 100 by communication means 22, preferably a cable.

In FIG. 2 there is shown a block diagram of the system for analyzing and processing an input analog signal. The system includes an analog signal preprocessor 20 and a main instrument 100.

The analog signal preprocessor 20 has four stages, the preamplifier stage 26, the filtering stage 40, the amplifier stage 50 and the envelope detector stage 59. Each stage has various modes of operation. The preamplifier stage 26 has a plurality of modes of operation. The preferable modes of operation for the preamplifier 26 is to amplify, at four different gains, the input analog signal from line 12.

The filter stage 40 has a plurality of modes of operation. The filter stage 40 preferably has at least five modes of operation, one for each filter 42, 46, 47, and 44, and one for the bypass line 36. In the preferred embodiment, filter 42 itself has four modes of operation. Therefore, the modes of operation of the filter stage 40 change when the frequency to be analyzed changes.

The amplifier 50 also has a plurality of operating modes. The amplifier 50 amplifies, at four different gains, the filtered signal on line 61. Each gain setting is considered a mode of operation.

The envelope detector 59 preferably has two modes of operation. In the first mode of operation, the amplified signal on line 60 passes through the envelope demodulator 69. In the second mode of operation, the amplified signal on line 60 bypasses the envelope demodulator 69.

Finally, another mode of operation of the analog signal preprocessor 20 is for the input analog signal to bypass all the stages of the analog signal preprocessor 20 through line 105. The input analog signal on line 12, in this mode of operation, is directly fed into the main instrument 100 through line 105.

From the above discussion it can be appreciated that the term "modes of operation" include; gain, changing the filter characteristics, and bypassing. These modes of operation are examples and other modes of operation could be added. Furthermore, the operating modes of each stage of the analog signal preprocessor 20 are controlled by the smart controller 90.

The analog signal preprocessor shown in FIG. 2 receives the analog signal on line 12. The analog signal is then amplified by the preamplifier 26 that produces a preamplified signal on line 32. The analog signal is then monitored with a monitor circuit 24 to determine the magnitude of the preamplified signal. The preamplified signal on line 32 is then received by the filtering circuit 40 which passes selected frequencies from the preamplified analog signal. The filter circuit 40 has various filters including high pass filters 42 and 44, and band-pass filters 46 and 47 and it includes a by-pass path on line 36. The filter circuit 40 is monitored for overloads. The filter circuit 40 produces a filtered signal (which may be the by-pass signal from line 36) on line 61 which is received by the amplifier 50. The amplifier 50 then amplifies the filtered signal and produces an amplified signal on line 60. One use of the amplifier 50 is to compensate for a small amplitude of the filtered signal. The amplified signal may either pass through an envelope detector 59, comprised of a full-wave rectifier 70 and low pass filter 80 or is bypassed through line 60 to line 82. Line 71 connects the full-wave rectifier 70 to low pass filter 80. The low pass filter 80 produces a preprocessed signal and transmits the preprocessed signal to the main instrument 100 on line 82.

The main instrument 100 has a master control 102 that is used to control the various stages of the analog signal preprocessor 20 and the main instrument 100. The master control 102 produces stage control signals which are communicated to the analog signal preprocessor 20 on line 150.

The analog signal preprocessor 20 has a smart control 90 that is used to receive the stage control signals, from the master control 100, on line 150 and responds to the stage control signals to select various stages of the analog signal preprocessor 20. The various stages of the analog signal preprocessor 20 function in various operating modes. These operating modes depend upon how the smart control 90 sets them. For example, the master control 102 sends a stage control signal on line 150 in which the preamplifier circuit 26 is to be setup with a gain of ten. The smart control 90 receives this signal, on line 150, and produces an appropriate control signal and sends it through line 28 to the preamplifier 26. Thus, the preamplifier 26 is set for a gain of ten.

The filter circuit 40 is initiated in the same manner as the preamplifier 26 except that the smart control 90 sends a control signal through line 34 to a switching circuit 43, which selects either the high pass filters, 40 or 44, the band pass filters 46 or 47, or, bypasses the filter circuit through line 36. The amplifier circuit 50 is also initiated by the smart control 90 through line 52 to setup the amplifier's 50 gain. Furthermore, the envelope detector 59 comprising the full-wave rectifier 70 and the low-pass filter 80 is controlled by smart control 90 through line 72. The smart control 90 controls the envelope detector by either sending the amplified signal on line 60 through the full-wave rectifier 70 and low-pass filter 80 or by bypassing the full-wave rectifier 70 and low-pass filter 80 through line 60.

The preprocessed signal received on line 82 is processed and analyzed by the main instrument 100 to obtain a reading. The analog signal, on line 12, is also directly transmitted to the main instrument 100 on line 105. This allows the main instrument 100 to analyze the analog signal directly from line 12 without the analog signal preprocessor 20 performing any amplifying or filtering.

Figure 4:
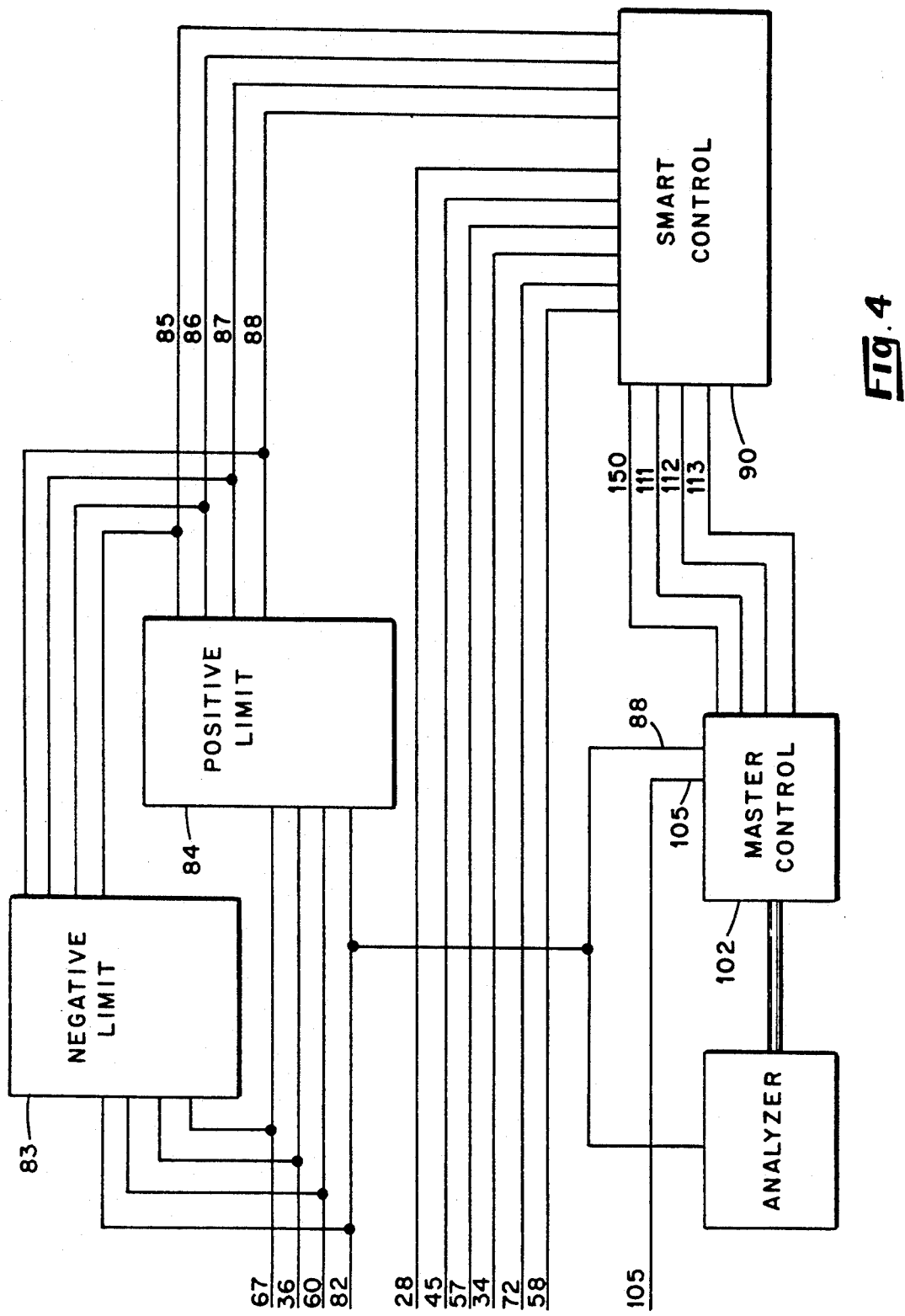
FIG. 4 is a detailed block diagram of the analog signal processor's control circuit and the main instrument.

Referring now to FIG. 3 and FIG. 4 there is shown a detailed block diagram of the analog signal preprocessor 20 and the main instrument 100. Again the analog signal is received by the preamplifier circuit 26 on line 12. The preamplified signal is transmitted to the filter circuits through line 32 and to switching circuit 43a through line 36. The high pass filter 42 is an elliptical high pass filter which filters the preamplified signal, on line 32, and transmits the filtered signal on line 41 to the switching circuit 43a.

The high pass filter 44 is a butterworth high pass filter with four selectable corner frequencies. High pass filter 44 also receives the preamplified signal on line 32. The high pass filter 44 receives a high pass frequency selection control signal on line 45 from the smart control 90 (FIG. 4) to select one of the four corner frequencies. The high pass filter 44 produces a filter signal transmitted to switching circuit 43a on line 58.

The band pass filter 46 has a set center frequency and frequency band and filters the preamplified analog signal from line 32. Band pass filter 47 also has a set center frequency and frequency band and filters the preamplified signal on line 32. Both band pass filters, 46 and 47, produce a filtered signal on lines 48 and 49 respectively. A band pass selecting circuit 55 receives the filtered signals on lines 48 and 49 and selects the appropriate signal required and outputs the band pass selected signal on line 56. The band pass selecting circuit is controlled by band pas control signal on line 57 produced by smart control 90 (FIG. 4).

The switching circuit 43a is controlled by the smart control 90 (FIG. 4) to select a filtered signal from the various filters for the appropriate selected stage. Smart control 90 (FIG. 4) transmits a control signal on line 34 to control the switching circuit 43a. The control signal on line 34, is determined by the stage control signal on line 150, received by the smart control 90 (FIG. 4) from the master control 102 (FIG. 4).

Once the switching circuit 43a selects a filtered signal, the selected filtered signal is transmitted on line 61 to the amplifier 50. The amplifier 50 produces an amplified signal on line 60. The amplified signal, on line 60, is fed into the envelope detector 69 that includes the full-wave rectifier 70 and the low pass filter 80 and is also fed into the switching circuit 65. The envelope detector 59 produces an envelope detected signal. The amplifier's 50 gain is controlled by the smart control's 90 (FIG. 4) control signal on line 52. The switching circuit 65 determines whether the amplified signal on line 60 or the envelope detected signal from the low pass filter 80 should be the preprocessed signal. The switching circuit 65 is controlled by a control signal 72 transmitted from the smart control 90 (FIG. 4). The switching circuit outputs the preprocessed signal on line 82.

The circuits of the analog signal preprocessor 20 are monitored to determine if all circuits are operating within a predetermined range and without overloading. The monitoring circuit includes monitor 43b which receives the filtered signals from the band pass and high pass filter, on lines 36, 41, 56, and 58, and outputs the selected filter overload signal on line 67. Also, the signal on line 36 is used as a pregain overload signal. Further, the amplified signal on line 60 is used as a post gain overload signal. Finally, the preprocessed signal on line 82 is used as an output overload signal. All of the overload signals on lines 36, 67, 60, and 82 are received by the negative limit circuit 83 and positive limit circuit 84 shown in FIG. 4.

The limit circuits, 83 and 84, monitor each overload signal on lines 36, 67, 60, and 82, and detects if the overload signal exceeds a certain predetermined level. If the predetermined level is exceeded then the limit circuits 83 and 84 output a signal on lines 85, 86, 87 or 88. The exceeded filter signal is on line 85, the pregain exceeded signal is on line 86, the postgain exceeded signal is on line 87 and the output exceeded signal is on line 88.

All of the exceeded signals are received by the smart control 90, on lines 85, 86, 87 or 88 and the proper adjustment is made to either amplification stage 26 and/or 50 to accommodate for any exceeded limit. The adjustments are made by the smart control 90 by changing the selected operation for each circuit through the select lines 28, and 52. The smart control 90 communicates any adjustments it has made to the amplifying circuits 26, and 50 to the master control on line 111.

The main instrument 100 can be set so that the analog signal preprocessor 20 will automatically set itself to the appropriate operation for processing the analog signal This is performed by sending an autorange stage signal on line 150 to the smart control 90. The smart control 90 then chooses the appropriate preamplifier gain 26 and amplifier gain 50. The smart control 90 continuously monitors the operating mode through the negative 83 and positive 84 limit circuits to maintain the appropriate preprocessed signal on line 82. This preprocessed signal on line 82 is received by main instrument 100 and analyzed. Line 22 (FIG. 1) includes lines 105, 82, 150, and 111-113 of FIG. 2, and 4.

The analog signal preprocessor's 20 stages may be manually set through the main instrument 100 by the user. For example, the user may want a consistent preamplifier 26 gain on all the measurements he takes. The user would thereby input the desired gain of the preamplifier 26 into the main instrument 100. The master controller 102 of the main instrument 100 would then send a control signal through line 150 to the smart controller 90 to set the gain. The smart controller 90 would then set the preamplifier's 26 gain through line 28 according to the signal received from the master controller 102.

If the gains of the amplifiers 26 and/or 50 are manually selected on the main instrument 100 and there is an overload of one of the stages, then the smart controller 90 will send a signal to the main instrument 100 that there is an overload condition. The analog signal preprocessor 20 under this condition will not adjust itself since it was set manually. The analog signal preprocessor 20 will wait until the overload condition is manually cured. The overload condition is cured by manually changing the gain or switching to autorange on the main instrument 100.

The amplifier circuit 50 of the analog signal preprocessor 20 compensates for any direct current offset larger than the actual signal of the filtered signal, on line 61. If the direct current offset is not compensated for it would affect the operation of the envelope detector 59. Also, the ability of the smart control 90 to adjust for any overloading of the analog signal preprocessor 20 circuits and communicate these adjustments to the master control 102 allows this invention to be flexible and accurate. This adjustment optimizes the use of the analog signal preprocessor 20 with the main instrument 100.

Figure 5:
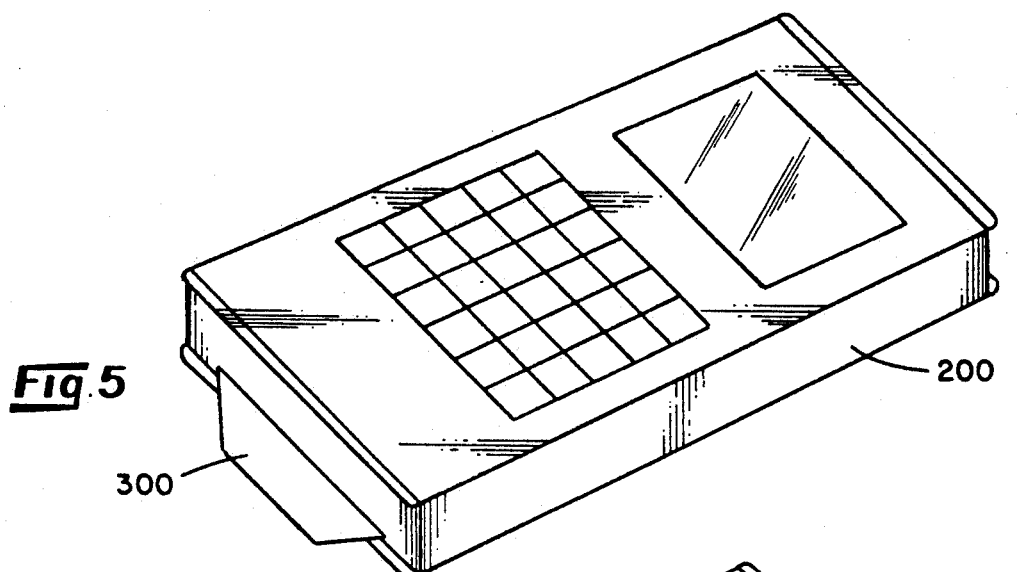
FIG. 5 is a perspective view of the front of the main instrument attached to the analog signal preprocessor.
Figure 6:
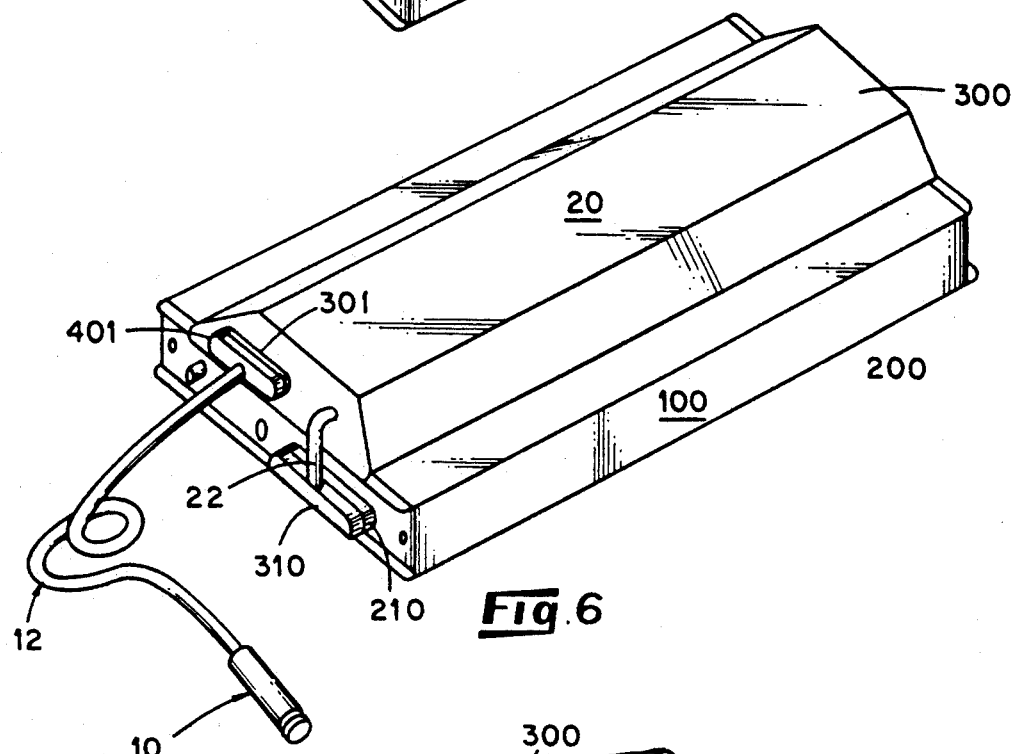
FIG. 6 is a perspective view of the bottom of the main instrument attached to the analog signal preprocessor with a sensor attached to the analog signal preprocessor.

Referring to FIG. 5 there is shown the analog signal preprocessor 20 in it's housing 300 attached to the main instrument's 100 housing 200. In FIG. 6 there is shown the analog signal preprocessor housing 300 attached to the main instrument housing 200 from the underside. A sensor 10 is connected to the cable 12 which is connected to plug 401. Plug 401 is plugged into the analog signal preprocessor's plug 301. The analog signal preprocessor output plug 310 is connected to the main instrument's input plug 210. A cable 22 connects the analog signal preprocessor 20 to it's plug 310 and allows communication between the analog signal preprocessor 20 and the main instrument 100. The main instrument's input plug 210 can also directly connect to the sensor 10 for operation without the analog signal preprocessor 20.

Figure 7:
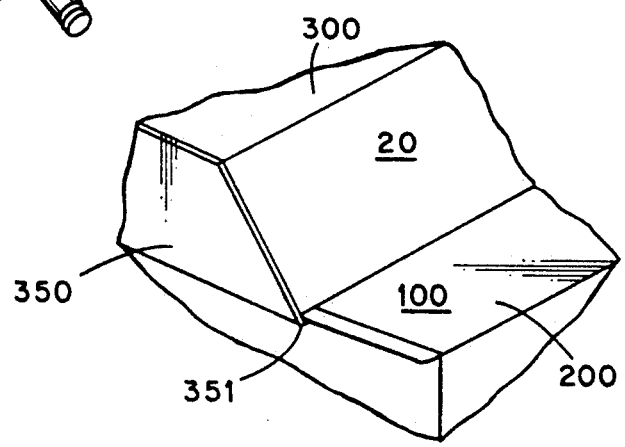
FIG. 7 is a perspective view of the end cap of the analog signal preprocessor attached to the main instrument.

FIG. 7 shows the end cap 350 of the analog signal preprocessor housing 300 attached to the main instrument housing 200 by lip 351. The lip 351 of the analog signal preprocessor housing's end cap 350 allows the analog signal preprocessor 20 to be easily attached and unattached to the main instrument 100.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A system for processing and analyzing an input signal comprising:
   an analog signal preprocessor for receiving and processing the input signal comprising:
   a) at least one processing stage for receiving the input signal and processing the input signal, said processing stage having at least first and second operating modes determinative of the manner in which the input signal is to be processed by said processing stage, said processing stage for producing a first preprocessed signal when operating in said first operating mode and for producing a second preprocessed signal when operating in said second operating mode, said first preprocessed signal being different from said second preprocessed signal; and
   b) preprocessor control means connected to said processing stage for monitoring and controlling said processing stage and selecting one of said operating modes of said processing stage to determine the manner in which the input signal is to be processed;
   a main instrument for receiving and analyzing an output of said analog signal preprocessor to determine at least one characteristic of said preprocessed signal and for controlling said analog signal preprocessor comprising:
   a) input means connected to said analog signal preprocessor for receiving at least one of said first and second preprocessed signals; and
   b) master control means for producing at least processing stage control signals;
   communication means for providing a communication link between said analog signal preprocessor and said main instrument and for transmitting at least said processing stage control signals from said master control means to said preprocessor control means; and
   said preprocessor control means being responsive to said processing stage control signals to select at least one of said first and second operating modes for said processing stage.

2. The system of claim 1 further comprising:
   said master control means having means for producing an autorange processing stage control signal; and
   said preprocessor control means further responds to said autorange processing stage control signal to independently select at least one of said first and second operating modes.

3. The system of claim 1 further comprising:
   monitoring means for monitoring said preprocessed signals, comparing said preprocessed signals to a predetermined limit, and producing predetermined limit signals when the predetermined limit is exceeded by said preprocessed signals; and
   said preprocessor control means receiving said predetermined limit signals and being responsive to said predetermined limit signals to select at least one of said first and second operating modes.

4. The system of claim 1 further comprising:
   said master control means further producing an autorange processor stage control signal and a manual processor stage control signal, said master controller generating at least one of said autorange or manual processor stage control signals depending upon input provided to said master controller and further providing said signal to said preprocessor control means;
   monitoring means for monitoring said preprocessed signals, comparing said preprocessed signals to predetermined limits, and producing a limit signal when said preprocessed signals exceed a predetermined limit;
   said preprocessor control means for further responding to the limit signal to independently select at least one of said operating modes to adjust said preprocessed signals to remain within said predetermined limits when the autorange processor stage control signal is received from said master control means; and
   said preprocessor control means being responsive to said limit signal to generate a limit exceed signal and provide said limit exceed signal to said master control means when said manual processor stage control signal is received from said master control means while remaining in the selected operating mode.

5. A system for processing and analyzing an input signal comprising:
   an analog signal preprocessor having a plurality of operating modes comprising:
   a) a preamplifier for receiving and preamplifying the analog signal in accordance with a selected gain determined by the operating mode and producing a preamplified analog signal;

b) a filtering stage for receiving the preamplified analog signal, filtering a selected frequency range from the preamplified signal selected in accordance with a frequency range determined by the operating mode and producing a filtered analog signal;

c) an envelope demodulator for receiving the filtered analog signal, rectifying the filtered analog signal, filtering the filtered analog signal and producing a preprocessed signal, said envelope demodulator either selected or de-selected in accordance with the operating mode; and d) preprocessor control means for controlling said operating modes of said analog signal preprocessor;

a main instrument for receiving the preprocessed signal and analyzing the preprocessed signal to determine at least one characteristic of said signal, said main instrument having a master control means for controlling the analysis of the preprocessed signal and producing operating control signals;

communication means for providing a communication link between said analog signal preprocessor and said main instrument and for transmitting at least said operating control signals to said preprocessor control means; and said preprocessor control means receiving the operating control signals and being responsive to the operating control signals to select at least one of said operating modes.

6. The system of claim 5 further comprising monitoring means for monitoring at least one of the operating modes and producing a monitored signal.

7. The system of claim 5 further comprising:
monitoring means for monitoring the preprocessed signal and producing a monitor signal;
said preprocessor control means receiving the monitor signal and being responsive to the monitor signal and the operating control signals to select one of said plurality of operating modes.

8. The system of claim 5 further comprising an amplifier for receiving and amplifying the filtered analog signal and producing an amplified analog signal to be received by said envelope demodulator.

9. The system of claim 8 further comprising:
monitoring means for monitoring the preprocessed signal and at least one of the preamplified analog signal, the filtered analog signal and the amplified analog signal and for producing monitor signals;
said preprocessor control means receiving said monitor signals and being responsive to said monitor signals and the operating control signals to select at least one of said plurality of operating modes.

10. The system of claim 8 further comprising:
monitoring means for monitoring the preamplified analog signal, the filtered analog signal, the amplified analog signal and the preprocessed signal, said monitoring means producing monitor signals; and
said preprocessor control means receiving the monitor signals and being responsive to the monitor signals and the operating control signals to select one of said operating modes said preprocessor control means responsive to said selected operating mode to generate control signals for selecting at least one of the following parameters: the gain of the preamplifier, the selected frequency range of the filtering stage, the gain of the amplifier, and the selection or de-selection of the envelope demodulator.

11. The system of claim 8 further comprising:
monitoring means for monitoring the preamplified analog signal, the filtered analog signal, the amplified analog signal and the preprocessed signal, and producing predetermined limit signals when a predetermined limit is exceeded by the preamplified analog signal, the filtered analog signal, the amplified analog signal or the preprocessed signal;
said preprocessor control means receiving the predetermined limit signals and being responsive to the predetermined limit signals and the operating control signals to select at least one of said operating modes.

12. The system of claim 8 further comprising:
negative limit detection means for detecting exceeded predetermined negative limit by the preamplified analog signal, the filtered analog signal, the filtered analog signal, the amplified analog signal and the preprocessed signal and the preprocessed signal, said negative limit detection means for producing negative limit signals;
positive limit detection means for detecting an exceeded predetermined positive limit by the preamplified analog signal, the filtered analog signal, the amplified analog signal and the preprocessed signal, said positive limit detection means producing positive limit signals;
said preprocessor control means receiving the negative and positive limit signals and being responsive to the negative and positive limit signals and the operating control signals to select one of said operating modes.

13. The system of claim 8 wherein said preamplifier comprises a selective gain amplifier being controlled by said preprocessor control means.

14. The system of claim 8 wherein said amplifier comprises selective gain amplifier being controlled by said preprocessor control means.

* * * * *